United States Patent
Wehler

(10) Patent No.: US 6,226,973 B1
(45) Date of Patent: May 8, 2001

(54) GUIDE CHAIN FOR ENERGY SUPPLY LINES

(75) Inventor: Herbert Wehler, Neunkirchen (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 09/297,006

(22) PCT Filed: Oct. 16, 1997

(86) PCT No.: PCT/EP97/05715

§ 371 Date: May 3, 1999

§ 102(e) Date: May 3, 1999

(87) PCT Pub. No.: WO98/19078

PCT Pub. Date: May 7, 1998

(30) Foreign Application Priority Data

Oct. 25, 1996 (DE) .............................................. 196 44 468

(51) Int. Cl.[7] .................................................. F16G 13/02
(52) U.S. Cl. .................................................. 59/78.1; 248/49
(58) Field of Search .................... 59/78, 78.1; 248/49, 248/51

(56) References Cited

U.S. PATENT DOCUMENTS

| 4,590,961 | 5/1986 | Schumann . | |
| 5,836,148 | * 11/1998 | Fukao | 59/78.1 |
| 5,890,357 | * 4/1999 | Blase | 59/78.1 |

FOREIGN PATENT DOCUMENTS

| 265 449 | 3/1989 | (DD) . |
| 195 12 088 | 10/1996 | (DE) . |
| 0 384 153 | 8/1990 | (EP) . |
| 0 693 638 | 1/1996 | (EP) . |
| 0 789 167 | 8/1997 | (EP) . |
| 1 431 382 | 4/1976 | (GB) . |

* cited by examiner

*Primary Examiner*—David Jones
(74) *Attorney, Agent, or Firm*—Alston & Bird LLP

(57) ABSTRACT

An energy supply line guiding chain that comprises flexibly interconnected chain links. The energy supply line guiding chain has a channel (6) that extends in the axial direction of the energy supply line guiding cable for receiving supply lines. The channel (6) is defined by chain links (2, 3, 4, and 5). Each chain link (2, 3, 4, and 5) has an opening (7, 8, 9, 10) that terminates in channel (6). The opening (7, 8, 9, 10) is defined by at least one cross bar (11; 12*a*, 12*b;* 13*a*, 13*b;* 14*a*, 14*b*). The openings (7, 8, 9, 10) of adjacent chain links (2, 3, 4, 5) are offset substantially transversely to the axial direction of the energy supply line guiding chain (1). Preferably, the energy supply line guiding chain (1) has a repeating sequence of links (16) with at least two adjacent chain links (2, 3, 4, 5) with openings (7, 8, 9, 10) offset relative to one another.

12 Claims, 3 Drawing Sheets

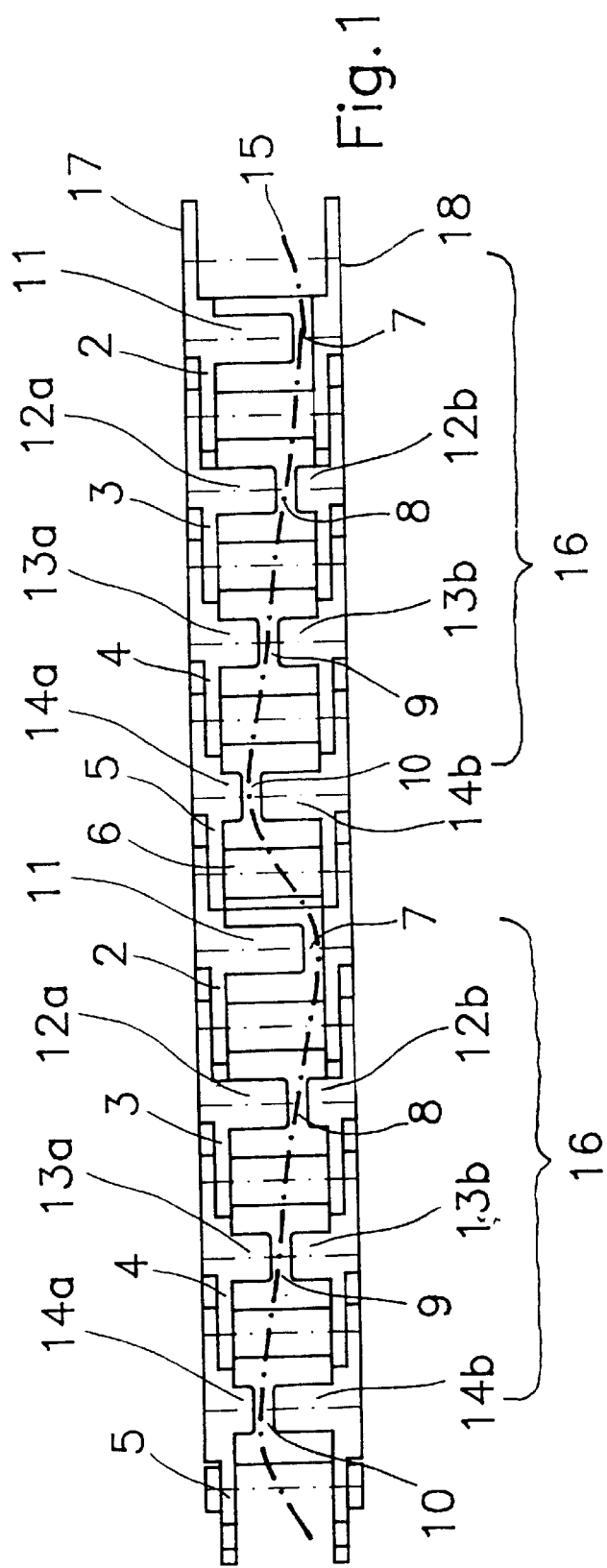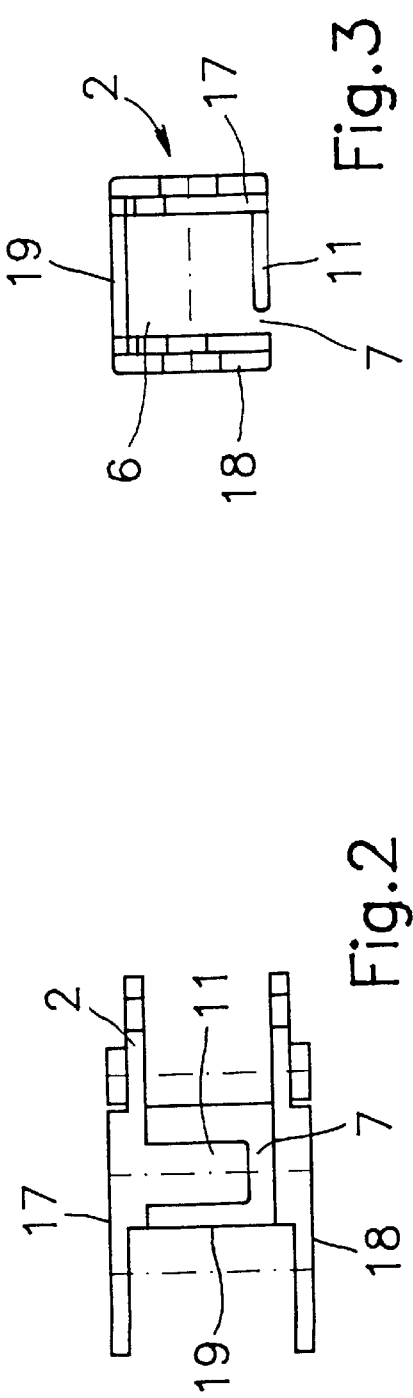

GUIDE CHAIN FOR ENERGY SUPPLY LINES

BACKGROUND OF THE INVENTION

The invention relates to an energy supply line guiding chain as well as to a chain link for an energy supply line guiding chain.

Known from DD 265 449 A1 is an energy supply line guiding chain for guiding supply lines that are used for supplying machines and movable elements. The energy supply line guiding chain comprises flexibly interconnected chain links that define a channel extending in the longitudinal direction of the energy supply line guiding chain. This channel is used for receiving supply lines. Each chain link has an opening terminating in the channel for inserting the supply lines into the channel. For the construction of the energy supply line guiding chain, DD 265 449 A1 proposes to convert an elastic strip by cuts transverse of the axial direction at selected distances from one another and of a selected cut length into a draw strip with profiled tongues that extend crosswise to the axial direction. Due to the fact that the energy supply line guiding chain consists of an elastic strip, it exhibits only a slight torsional rigidity. The use of such an energy supply line guiding chain is therefore limited.

Further known is an energy supply line guiding chain that comprises flexibly interconnected chain links, the chain links having two chain side plates that face each other in spaced relationship and are interconnected by a cross bar. Each chain side plate has a cross bar extending toward the opposite chain side plate. The cross bars are springy. The end sections of the cross bars overlap. To be able to insert a supply line into a channel formed by such chain links, the cross bars are deflected accordingly. Since the cross bars are deflected into the channel when a supply line is inserted thereinto, the possible number of lines that can be inserted into the channel is smaller than in the case of chain links having the same dimensions with releasable cross bars, as are disclosed, for example, in EP 0 384 153 A2. Because the cross bars must be flexible, and the chain link with the cross bars is made in one piece, such a chain link is relatively easily deformable.

Based on the foregoing, it is an object of the present invention to further develop the known energy supply line guiding chain such that with a simplified insertion of supply lines into a channel extending in the axial direction of the energy supply line guiding chain, the energy supply line guiding chain is torsionally rigid. A further object of the invention is to describe a chain link that is suitable for a torsionally rigid energy supply line guiding chain.

SUMMARY OF THE INVENTION

The above and other objects and advantages of the present invention are achieved by the provision of a chain link for an energy conducting guide chain which comprises two parallel side plates which define a longitudinal direction along the length thereof, and a cross plate interconnecting the two side plates so as to form a U-shaped receiving member which defines a central guide channel which extends in the longitudinal direction. Also, at least one rigid cross bar extends from one of the side plates toward the opposite side plate at a location spaced in an upright direction from the cross plate, and with the one cross bar terminating at a location spaced apart from the opposite side plate so as to define an opening which opens into the guide channel. By this arrangement, an energy conducting supply line may be inserted into said guide channel via the opening.

To form the guide chain, a plurality of the chain links are serially arranged with adjacent chain links being pivotally connected to each other, and preferably, substantially all of the adjacent chain links include at least one cross bar and associated opening. The openings of adjacent chain links which include the cross bar and opening are offset from each other in a direction transverse to the axial, i.e. longitudinal direction. In such an energy supply line guiding chain, the chain links may consist of a plastic, in particular a fiber-reinforced plastic. Suitable therefor are in particular carbon fiber and/or fiber glass-reinforced plastics. Preferably, the rigid cross bar of the chain link is also formed of a fiber-reinforced plastic. Due to the fact that the openings of adjacent chain links are made offset substantially transversely to the axial direction of the energy supply line guiding chain, a supply line that was inserted into the channel extending in the axial direction of the energy supply line guiding chain is unable to emerge automatically from the channel, since the individual rigid cross bars act as blocking elements. Because of this configuration of the energy supply line guiding chain, a high torsional rigidity of same is realized. Such energy supply line guiding chains are also suitable for guiding relatively stiff supply lines, since a cross bar can absorb the force exerted on it by the supply lines without undergoing a relevant flexure.

To simplify insertion of supply lines into the channel of the energy supply line guiding chain and their removal therefrom, it is proposed that the openings are made to alternate about a straight-line extending in the axial direction of the energy supply line guiding chain, preferably about a longitudinal axis. To avoid that the supply lines are excessively bent during assembly, it is proposed to arrange the opening along an imaginary line that is continuously curved. It is preferred to arrange the openings along an imaginary, wavelike, preferably sinusoidal line.

For an economic manufacture of an energy supply line guiding chain, it is proposed that same has at least one repeating sequence of links with at least two adjacent chain links having openings offset from each other. In particular, the energy supply line guiding chain is formed by at least one regularly repeating sequence of links. Preferred is a configuration of the energy supply line guiding chain, wherein same consists of only one repeating sequence of links. A sequence of links comprises at least two adjacent chain links, preferably four chain links. This allows to reduce the cost of manufacture, since the number of chain link variations is limited.

An energy supply line guiding chain, wherein each chain link has two spaced-apart, opposite chain side plates, is preferably characterized in that at least one chain side plate has at least one cross bar that extends toward the opposite chain side plate, terminates in front of same, and partially defines the opening. Preferably, the cross bars extend in a common plane. Especially preferred is a configuration of the energy supply line guiding chain, wherein the cross bars extend at least substantially perpendicularly to the chain side plates.

To prevent the supply line from being damaged when it is inserted into the channel or removed therefrom, it is proposed to curve the free end of the cross bar convexly.

Another inventive concept proposes a chain link for an energy supply line guiding chain with two spaced-apart, oppositely arranged chain side plates that are interconnected by a cross plate and define in part a channel extending in the axial direction of the energy supply line guiding chain for receiving supply lines, the chain link having an opening that terminates in the channel and is defined by at least one cross bar. In this chain link, at least one chain side plate has at least one rigid cross bar that extends toward the opposite chain side plate, terminates in front thereof and partially defines the opening. Preferably, the side plates, the cross plate, and the cross bars are made in one integral piece from a fiber reinforces plastic. The fiber-reinforced plastic imparts to the chain link a high stability.

BRIEF DESCRIPTION OF THE DRAWINGS

Further characteristics and details are described with reference to embodiments illustrated in the drawing, in which:

FIG. 1 is a top view of a section of an energy supply line guiding chain;

FIG. 2 is a top view of a first embodiment of a chain link;

FIG. 3 is a side view from the right of the chain link of FIG. 2;

DETAILED DESCRIPTION OF THE PREFERRED EMBODIMENTS

Figure 4:
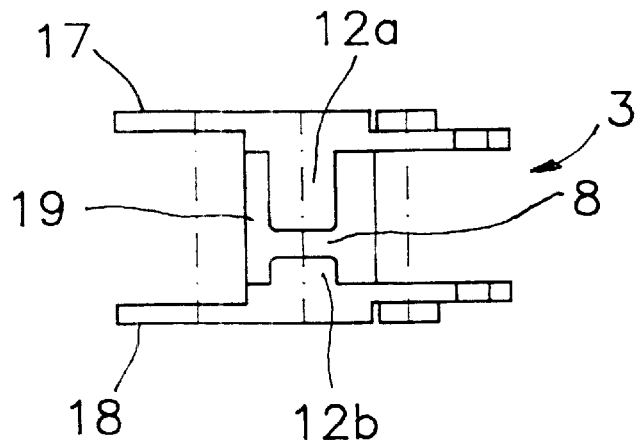
FIG. 4 shows a second embodiment of a chain link.

FIG. 1 shows a section of an energy supply line guiding chain 1. The energy supply line guiding chain 1 is formed by flexibly interconnected chain links 2, 3, 4, and 5. Each chain link 2, 3, 4, 5 defines a channel 6 that extends in the axial direction of the energy supply line guiding chain 1. The channel 6 is designed for receiving supply lines not shown. Each chain link 2, 3, 4, and 5 has two spaced-apart, opposite chain side plates 17, 18. The chain side plates 17, 18 are interconnected by a bottom cross plate 19. To insert a supply line into the channel 6 and to remove it therefrom, each chain link 2, 3, 4, and 5 has an opening 7, 8, 9, and 10 respectively. The opening 7, 8, 9, or 10 terminates in channel 6. The width of the opening 7, 8, 9, or 10 transverse of the axial extension of the energy supply line guiding chain 1 is defined by a cross bar 11 or 12a, 12b; 13a, 13b; 14a, 14b. The chain link 2 has a cross bar 11 that extends from chain side plate 17 toward the opposite chain side plate 18, as best seen in FIGS. 2 and 3.

Figure 5:
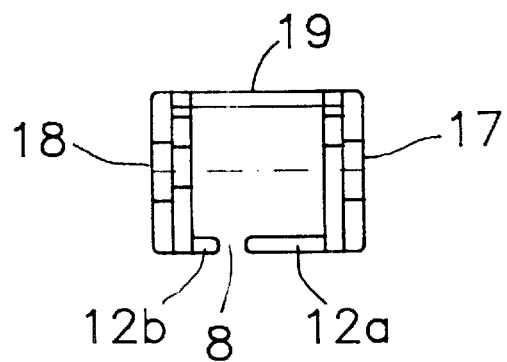
FIG. 5 is a side view from the right of the chain link of FIG. 4.

FIGS. 4 and 5 show the chain link 3 of energy supply line guiding chain 1. The chain link 3 has a cross bar 12a that extends from side plate 17 toward side plate 18, as well as a cross bar 12b that extends from side plate 18 toward side plate 17. The cross bar 12a and the cross bar 12b of chain link 3 extend in the same plane. As shown in FIG. 5, the free end of cross bar 12a and of cross bar 12b is convexly curved. Between opposite ends of cross bars 12a, 12b an opening 8 is formed. The spacing of opening 8 is offset from opening 7 of the adjacent chain link 2 transversely to the axial direction of the energy supply line guiding chain.

Figure 6:
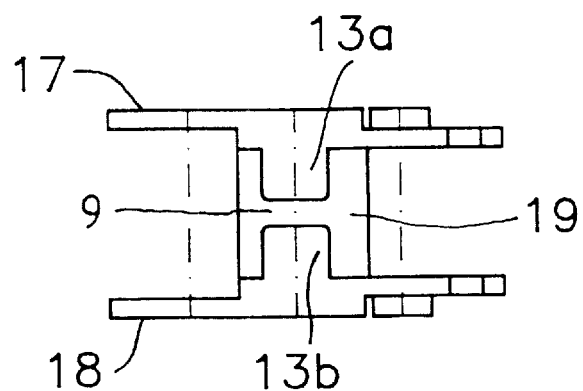
FIG. 6 shows a third embodiment of a chain link.
Figure 7:
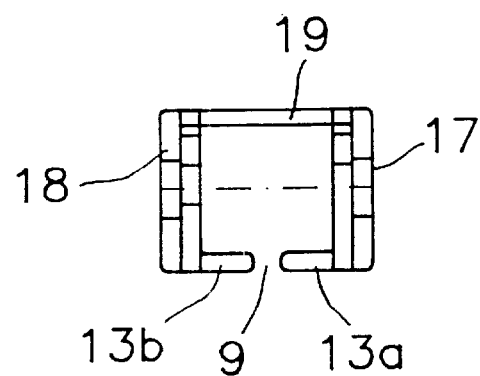
FIG. 7 is a side view from the right of the chain link of FIG. 6.

FIGS. 6 and 7 show the chain link 4 of the energy supply line guiding chain 1 of FIG. 1. The chain link 4 has two spaced-apart chain side plates 17, 18 that have each a cross bar 13a and 13b. The cross bar 13a extends from chain side plate 17 toward chain side plate 18, whereas the cross bar 13b extends from chain side plate 18 toward chain side plate 17. Between the free ends of cross bars 13a, 13b an opening 9 is formed. As can be noted from FIG. 1, the opening 9 is offset relative to the opening 8 of chain link 3 toward the center of the channel.

Figure 8:
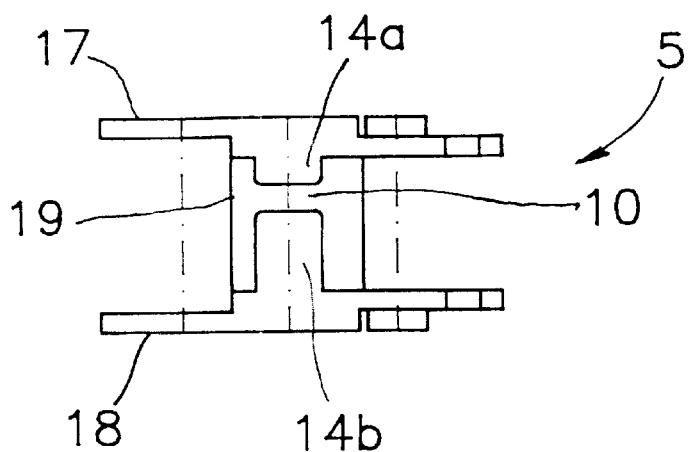
FIG. 8 is a top view of a fourth embodiment of a chain link.
Figure 9:
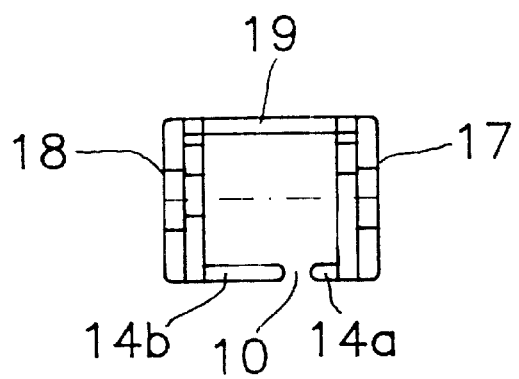
FIG. 9 is a side view from the right of the chain link of FIG. 8.
Figure 10:
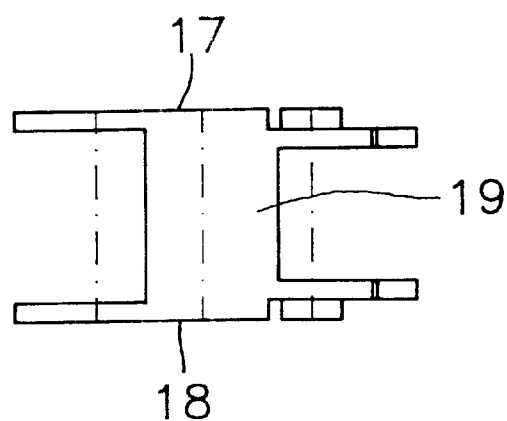
FIG. 10 is a bottom view of a chain link.

FIGS. 8 and 9 show the chain link 5 of energy supply line guiding chain 1 of FIG. 1. The chain link 5 has likewise two spaced-apart chain side plates 17 and 18 that are interconnected via a plate 19. A cross bar 14a extends from chain side plate 17 toward chain side plate 18. A cross bar 14b extends from chain side plate 18 toward chain side plate 17. The cross bars 14a and 14b extend in a common plane as best seen in FIG. 9. An opening 10 defined by the free ends of cross bars 14a, 14b is closer to side plate 17 than to side plate 18. The opening 10 of chain link 5 is offset relative to the opening 9 of chain link 4 crosswise to the axial direction of the energy supply line guiding chain 1.

The chain links 2, 3, 4, and 5 form a sequence of links 16. In the section of energy supply line guiding chain 1, as shown in FIG. 1, the sequence of links repeats itself. It should be noted that an energy supply line guiding chain might have different sequences of links 16. Between the sequences of links 16, it is also possible to arrange chain links of a different design.

By repeating the sequence of links 16 and the offset arrangement of openings 7, 8, 9, and 10, the openings 7, 8, 9, and 10 of the energy supply line guiding chain extend along a continuously curved, imaginary connecting line 15. The curvature of the imaginary connecting line 15 can be varied by the offset of the openings relative to one another.

The cross bars 11, 12a, 12b, 13a, 13b, 14a, and 14b as well as the chain side plates 17, 18, and the plate 19 consist of a fiber-reinforced plastic, preferably a fiberglass-reinforced and/or carbon fiber-reinforced plastic. Due to this construction of the chain links 2, 3, 4, and 5, same are imparted a high stability. The cross bars 11, 12a, 12b, 13a, 13b, 14a, and 14b are relatively rigid. Supply lines that are to be inserted into the channel 6 are pressed thereinto through openings 7, 8, 9, and 10. Because the openings 7, 8, 9, and 10 do not extend along a common straight-line, the cross bars 11, 12a, 12b, 13a, 13b, 14a, and 14b act as blocking elements, thereby avoiding that a supply line exits from the channel. The energy supply line guiding cable of the present invention is relatively torsionally rigid. It also offers a better utilization of the channel 6, since the cross bars 11, 12a, 12b, 13a, 13b, 14a, and 14b are not pressed or pressed only to a very slight extent into channel 6, when a supply line is inserted. The width of the cross bars, i.e., their extension in the axial direction of the energy supply line guiding chain can be adapted to the use of the energy supply line guiding chain. They may be as wide as or wider than the plate 19 that interconnects the chain side plates 17, 18.

I claim:

1. A guide chain for supporting one or more energy conducting supply lines from a fixed connection to a movable consuming device, comprising a plurality of chain links, with each of said links comprising two parallel side plates which define a longitudinal direction along the length thereof, and a cross plate interconnecting the two side plates so as to form a U-shaped receiving member which defines a central guide channel which extends in the longitudinal direction, and with at least some of said plurality of chain links further comprising at least one rigid cross bar extending from one of the side plates toward the opposite side plate at a location spaced in an upright direction from the cross plate, and with the one cross bar terminating at a location spaced apart from the opposite side plate so as to define an opening which opens into said guide channel, said chain links being serially arranged with adjacent chain links being pivotably connected to each other, and with said openings of adjacent chain links which include said openings being offset from each other in a direction transverse to the longitudinal direction, whereby an energy conducting supply line may be inserted into the guide channels of said chain links via the associated openings.

2. The guide chain as defined in claim 1, wherein the openings of adjacent chain links which include said openings are arranged to alternate about a straight line extending in the longitudinal direction.

3. The guide chain as defined in claim 1, wherein the openings are arranged along a generally sinusoidal line.

4. The guide chain as defined in claim 1, wherein the openings are arranged to define repeating patterns, with each pattern extending along a plurality of adjacent chain links.

5. The guide chain as defined in claim 1, wherein each side plate of at least some of said chain links which include said openings has a cross bar which extends toward the cross bar of the opposite side plate, with the free ends of the cross bars being spaced apart to define said opening.

6. The guide chain as defined in claim 5, wherein said cross bars of said some chain links extend in a common plane.

7. The guide chain as defined in claim 6, wherein said cross bars of said some chain links each extend substantially perpendicularly from the associated side plate.

8. The guide chain as defined in claim 7, wherein said cross bars of said some chain links each have a free end which is convexly curved.

9. The guide chain as defined in claim 1, wherein substantially all of said adjacent chain links include said at least one rigid cross bar and associated opening.

10. The guide chain as defined in claim 1 wherein the side plates of adjacent chain links overlap and are pivotably connected to each other.

11. The guide chain as defined in claim 10 wherein each of said rigid cross bars has a width in the longitudinal direction which is substantially less than the longitudinal length of the side plates of the associated chain link.

12. The guide chain as defined in claim 11 wherein the U-shaped receiving member of each chain link is rigid.

* * * * *